United States Patent [19]
Chase

[11] 3,877,724
[45] Apr. 15, 1975

[54] VARIABLE TORQUE DRIVE MECHANISM FOR BICYCLES
[76] Inventor: Zenas E. Chase, 7510 East 27 St., Tucson, Ariz. 85710
[22] Filed: Oct. 1, 1973
[21] Appl. No.: 402,098

[52] U.S. Cl................................ 280/241; 280/253
[51] Int. Cl............................................. B62m 1/04
[58] Field of Search .......... 280/241, 252, 253, 255, 280/256, 257; 74/128, 129

[56] References Cited
UNITED STATES PATENTS

| | | | |
|---|---|---|---|
| 584,808 | 6/1897 | Young | 280/253 |
| 968,355 | 8/1910 | Hopkins | 74/128 |
| 1,231,377 | 6/1917 | Kawalle | 74/129 |
| 2,732,221 | 1/1956 | Welch | 280/241 |
| 3,375,023 | 3/1968 | Cox | 280/255 |

Primary Examiner—Kenneth H. Betts
Assistant Examiner—Jack D. Rubenstein
Attorney, Agent, or Firm—Cahill, Sutton & Thomas

[57] ABSTRACT

A variable torque drive mechanism for efficiently converting generally lateral motion into rotational motion.

3 Claims, 8 Drawing Figures

VARIABLE TORQUE DRIVE MECHANISM FOR BICYCLES

This invention relates to drive mechanisms and, more particularly, to variable torque drive mechanisms which convert oscillatory lateral motion into rotational motion with a variable torque capability.

Typically, foot operated drive systems such as those used on bicycles are configured to convert rotational motion at the sprocket mounted foot pedals to rotational motion at the rear wheel. The desired mechanical advantage is derived by selecting an appropriate gear ratio between the main sprocket at the pedals and the drive sprocket mounted on the rear axle. Frequently there has been included provisions for varying the effective torque created at the rear wheel. This variable torque feature has been accomplished by providing means for shifting the position of the drive chain between various combinations of sprockets having different radii.

The aforementioned type of prior art drive system is relatively complex, subject to mechanical failure and is limited to incremental rather than continuous torque ratio variations.

Prior art systems which depend upon rotational foot motion waste a great deal of the user's energy because they fail to maximize the available torque producing forces which are exerted in a direction normal to the shafts supporting the foot pedals.

It is an object of the present invention to provide a drive mechanism which will convert oscillatory, generally lateral, foot motion to rotational motion.

It is a further object of the present invention to provide an improved drive system having the capability of continuously varying the effective torque ratio between the drive pedals and the ultimately driven wheel.

Still another object of the present invention is to provide a drive system which will assure maximum utilization of the torque producing forces generated by the user.

Briefly stated and in accord with one embodiment of the invention, a drive mechanism having a pair of vertically oscillatory pedals, a corresponding pair of transmission gears, an oscillatory torque arm and a chain and sprocket ratchet mechanism is used to convert vertically oriented forces exerted by a bicycle rider to rotational forces at the rear wheel of the bicycle.

The invention is pointed out with particularity in the appended claims. However, other objectives and advantages, together with the operation of the invention, may be understood by reference to the following detailed description taken in conjunction with the following illustrations, wherein:

Figure 1:
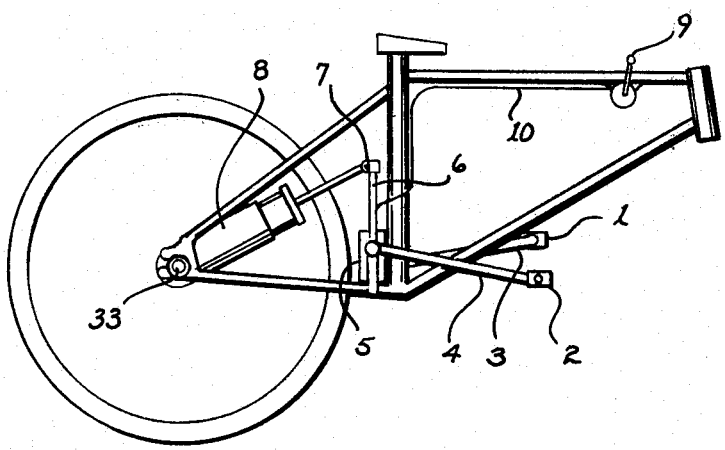
FIG. 1 is a partial illustration of the drive mechanism of the present invention installed for use on a bicycle.

Referring first to FIG. 1, it is seen that the drive mechanism of the present invention may be installed for use on a standard bicycle. Only the rear drive portion of the bicycle has been shown in FIG. 1. As can be seen, the drive mechanism consists of left pedal 1, right pedal 2, left pedal shaft 3, right pedal shaft 4, transmission 5, variable torque arm 6, slidable connection 7, and chain and sprocket ratchet assembly 8. Control lever 9 is in mechanical connection with slidable member 7 by means of the variable length cable 10.

Figure 3:
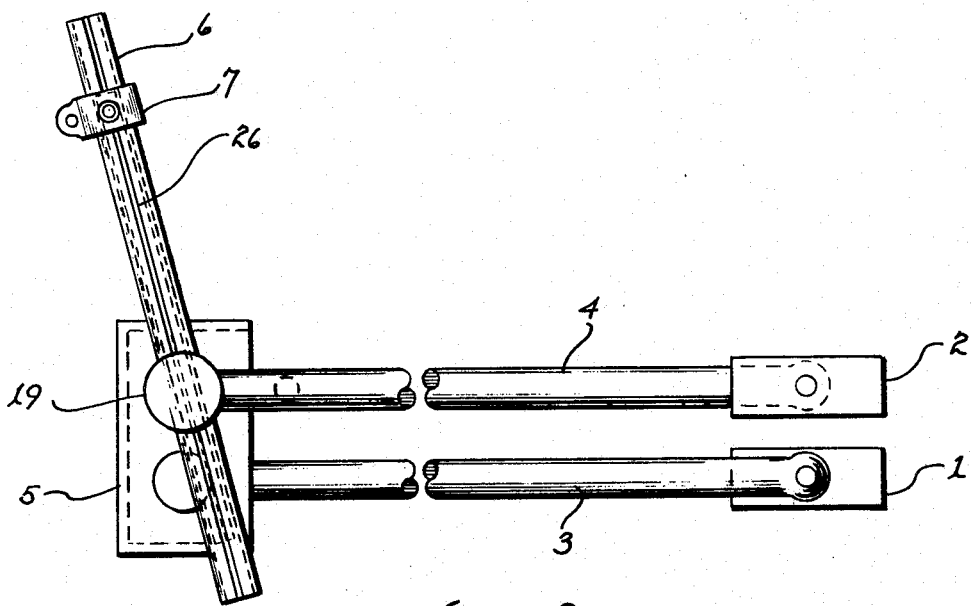
FIG. 3 is a side elevation illustrating the pedal, transmission and torque arm portions of the invention.

The operation of the pedal, transmission, and torque arm portions of the invention may be best discussed with reference to FIGS. 3, 4 and 8 wherein common elements are identified by the same reference numerals.

The bicycle operator exerts downward oscillatory force on the foot pedals 1 and 2. These pedals and the shafts 3 and 4 to which they are connected are each capable of moving through an angle to approximately (70°) so that, by way of example, when pedal 1 is in its most extreme downward position, pedal 2 is in its most extreme upward position and the angle between shafts 3 and 4 is approximately (70°). As can be seen with particular reference to FIG. 8, downward force on pedal 1 results in the counterclockwise rotation of transmission gear 11 and the corresponding clockwise rotation of transmission gear 12. Because transmission gear 12 is secured to shaft 4, the downward motion of pedal 1 results in upward motion being imparted to pedal 2 and its supporting shaft 4.

Figure 4:
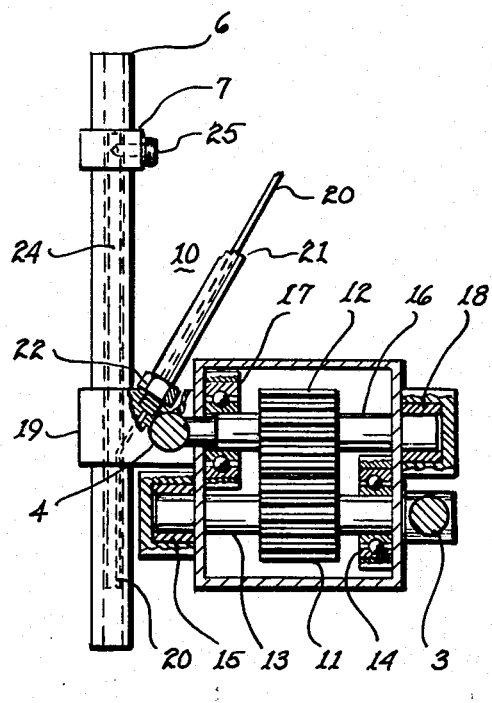
FIG. 4 is a partially cutaway view of the transmission and torque arm portions of the invention.

As can be seen with reference to FIG. 4, transmission gear 11 is supported by means of an axle 13 which in turn is supported at one end by a ball bearing structure 14 and at another end by a roller bearing structure 15.

Similarly, transmission gear 12 is mounted in position by axle 16 which is supported at one end by a ball bearing structure 17 and at another end by a roller bearing structure 18.

The axle 16 associated with the transmission gear 12 is secured for mechanical rotation with both shaft 4 and hub 19.

Torque arm 6 passes through, and is secured to, hub 19.

FIG. 4 further illustrates that variable length cable 10 consists of a movable internal cable 20 and a stationary outer shield 21. The stationary shield 21 is secured in a known manner to the hub 19 by way of threaded member 22. THe internal cable 20 passes through hub 19 and into the internal axially disposed cavity 26 of torque arm 6. The internal cable 20 is mechanically secured to the lower end portion of a sliding rod 24 which is disposed for movement within internal cavity 26. Slidable member 7 is mechanically connected to sliding rod 24 by means of an appropriate set screw 25 which extends through an axial slot 26 which is best shown in FIGS. 3 and 8.

Referring again to FIG. 4, it is seen that as movable cable 20 is drawn in a generally upward direction, the sliding rod 24 is forced up within cavity 26 and correspondingly slidable member 7 is moved further away from the center of hub 19, whereby the effective moment arm associated with torque arm 6 is increased.

Figure 2:
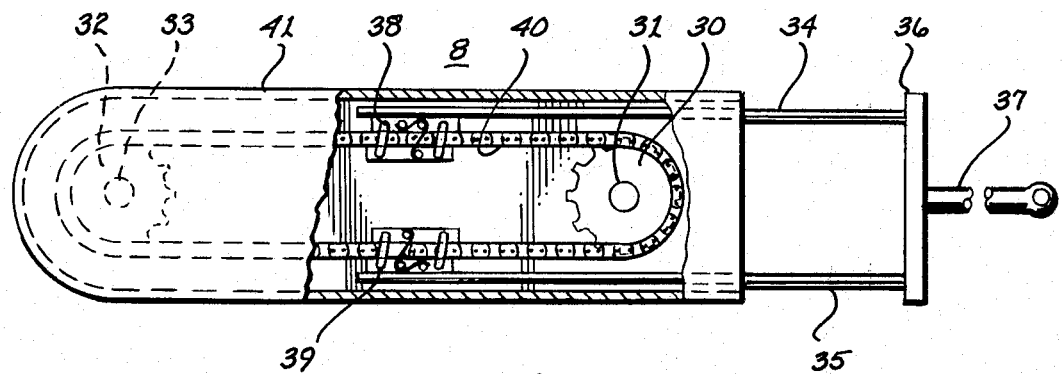
FIG. 2 is a detailed drawing showing the chain and sprocket ratchet portion of the invention.

FIG. 2 illustrates the chain sprocket ratchet portion 8 of the invention. As can be seen, this consists of a free sprocket 30 which rotates about an axle 31 and a drive sprocket 32 which is secured to the rear axle 33 to which the rear wheel of the bicycle is mounted. Ratchet arms 34 and 35 are joined together by linkage member 36 which in turn is secured to a connecting shaft 37. An upper ratchet member 38 is connected to ratchet arm 34 and a lower ratchet member 39 is connected to ratchet arm 35. A drive chain 40 links sprocket 30 with sprocket 32 while passing through ratchets 38 and 39. The entire assembly is covered by a protective case 41.

Figure 5:
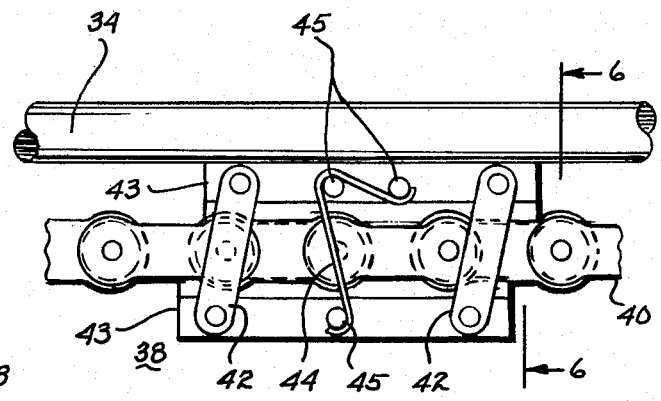
FIG. 5 is a detailed side elevation illustrating the ratchet jaws and their relationship to the drive chain portion of the invention.
Figure 6:
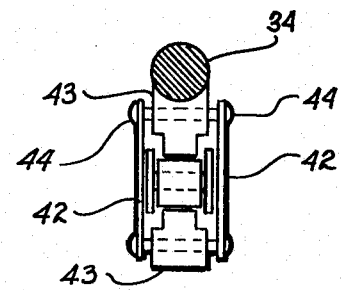
FIG. 6 is a sectional view taken along section 6-6 of FIG. 5.

FIGS. 5 and 6 show in more detail the upper ratchet member 38 and its relationship to the ratchet arm 34 and the drive chain 40.

Ratchet member 38 consists of two pairs of parallel linkages 42 and a pair of oppositely disposed locking jaws 43. A pair of springs 44 is disposed about three (3) positioning pins 45. Springs 44 bias locking jaws 43 to an open position when ratchet arm 34 is forcibly drawn from the left to the right. The force of biasing springs 44 is overcome and locking jaws 43 are drawn into tight contact with the links of drive chain 40.

When ratchet arm 34 is forcibly drawn from the right to the left, the biasing force of springs 44 is unopposed and locking jaws 43 are drawn to their open position.

Accordingly, with reference to FIG. 5, rightward motion of ratchet arm 34 serves to advance drive chain 40 to the right while any leftward motion of ratchet arm 34 has no effect on the relative position of drive chain 40.

As will be obvious to persons of ordinary skill in the art viewing FIG. 2, the lower ratchet mechanism 39 tightly engages the drive chain 40 in response to any leftward motion of the lower ratchet arm 35. Lower ratchet 39 is disengaged from the drive chain 40 during any rightward motion of the lower ratchet arm 35.

Figure 8:
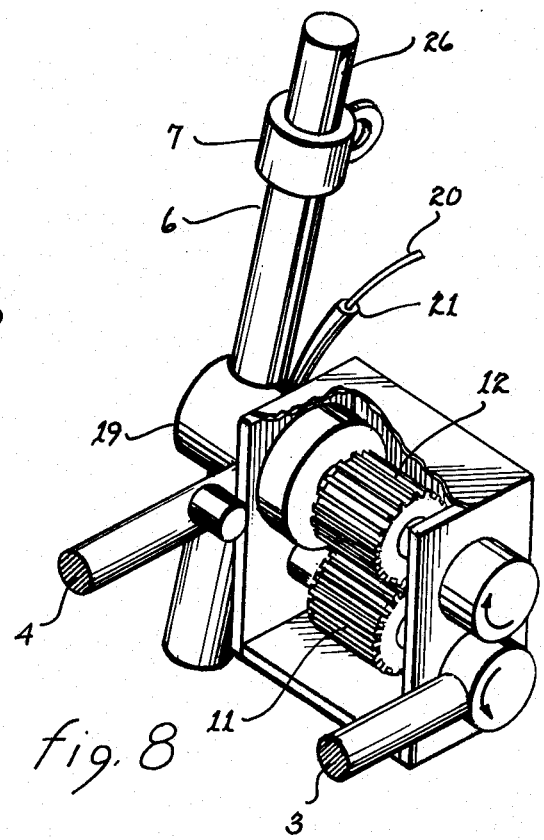
FIG. 8 is a partial perspective view showing the internal portion of the transmission and the relationship of the transmission to the pedal shafts and torque arm.

The overall operation of the drive mechanism of the present invention may be reviewed with reference to FIGS. 1 and 8. The operator's feet automatically move foot pedals 1 and 2, and respective shafts 3 and 4 through an angle of motion of approximately (70°). The downward force exerted on one pedal serves both to pivot torque arm 6 and to raise the other pedal. Torque arm 6 is caused to oscillate back and forth, in turn shifting the position of connecting member 37 and thus upper and lower ratchet arms 34 and 35. As the ratchet arms move in one direction, one of the ratchet assemblies engages the drive chain 40 while the other ratchet assembly is disengaged. Motion of the ratchet arms 34 and 35 in an opposite direction results in the disengagement of the first ratchet assembly from the drive chain 40 and the engagement of the formerly disengaged ratchet assembly. As a result, drive chain 40 is advanced in a counterclockwise direction as viewed in FIG. 2 as is drive sprocket 32. The end result of the counterclockwise rotation of sprocket 32 is, of course, the advancement of the bicycle itself.

Adjustment of lever 9 results in the upward or downward displacement of sliding member 7 which varies the effective moment arm associated with torque arm 6. As sliding member 7 is moved downward as viewed in FIG. 1 or closer to hub 19 as viewed in FIG. 4, the effective torque developed at the rear axle is increased. Accordingly, the effective torque at the rear axle may be continuously varied depending upon the load under which the bicycle is operated.

Figure 7:
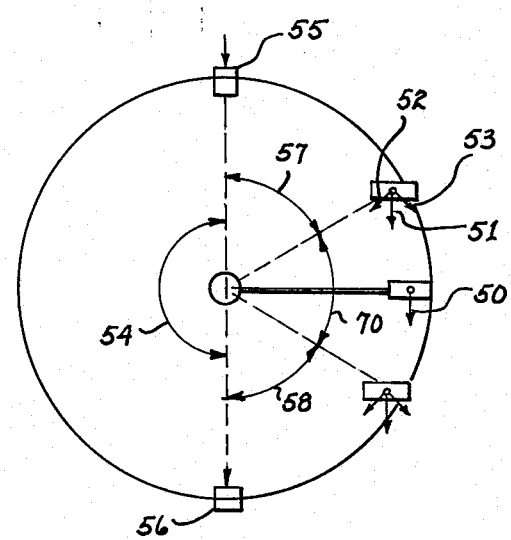
FIG. 7 is a vector diagram showing the general relationship between the force vectors exerted during the use of the present invention and comparing same to the prior art.

FIG. 7 is a circular vector diagram showing the center and extreme positions of pedal 1 and associated pedal shaft 3. The extreme upper and extreme lower portions are shown by dotted lines. As can be seen in FIG. 7, at the central position the entire downward force of the operator is translated into a tangential torque producing vector 50. In the upper pedal position, the downward force vector 51 is divided into a radial component 52 and a tangential component 53. Only the tangential component 53 is productive of torque at the rear axle of the bicycle. The radial portion of the exerted force essentially represents unused energy.

In the case of the prior art bicycle drive mechanisms wherein the pedals rotate through (360°), there exists a (180°) sector of rotation 54 wherein no useful tangential force vector is transferred to the pedal. In prior art pedal positions 55 and 56, the entire force component is radial and in the sectors 57 and 58, the useful tangential force vector is relatively small by comparison to the radial force vector. Accordingly, it may be seen that the present invention serves to greatly optimize the amount of useful torque transferred to the rear axle of the bicycle.

Although the invention has been shown in one preferred embodiment, i.e. that of a bicycle, it will be obvious to those skilled in the art that the same drive mechanism may be used in other foot operated devices such as paddle boats, tricycles, sewing machines and related devices.

Accordingly, it is intended by the appended claims to cover all such modifications of the invention which fall within the true spirit and scope of the invention.

I claim:

1. A variable torque driving mechanism for converting generally lateral foot movement to rotary movement, which mechanism comprises in combination:
    a. first and second radial shafts, each separately including: (i) a foot pedal mounted at one shaft extremity, and (ii) an axle of rotation connected at the opposite extremity;
    b. a variable torque arm;
    c. slide means axially movable along said torque arm during operation of said driving mechanism for selecting various moment points on said torque arm;
    d. transmission means for: (i) limiting the effective angle through which said first and said second radial shafts may rotate about their corresponding axles of rotation, (ii) translating movement of one of said foot pedals into an equal and oppositely directed movement of the other of said foot pedals, and (iii) oscillating said torque arm in direct response to the movement of said foot pedals;
    e. chain and sprocket ratchet means including: (i) a free turning sprocket, (ii) a drive shaft, (iii) a drive sprocket connected to said drive shaft, (iv) a continuous chain for mechanically linking said sprockets, (v) first ratchet means for selectively engaging said drive chain in response to relative motion in a first direction, (vi) second ratchet means for selectively engaging said drive chain in response to relative motion in a second direction, said direction being generally opposite to said first direction, (vii)

linkage means for connecting said first and said second ratchet means to said slide means; and f. control means for positioning said slide means at various points along said torque arm.

2. The mechanism of claim 1 wherein said transmission means includes first and second mutually engaged gears secured to the axles of rotation of said first and second radial shafts, said gears being substantially identical.

3. The mechanism of claim 2 wherein said control means includes a variable length cable disposed between an actuating lever and said slide means.

* * * * *